United States Patent [19]

Gladney et al.

[11] Patent Number: 4,782,557
[45] Date of Patent: Nov. 8, 1988

[54] SQUIRREL SKINNING DEVICE

[76] Inventors: Tommy Gladney, P.O. Box 363; William E. Baker, 804 Hwy. 9 S., both of Eupora, Miss. 39744

[21] Appl. No.: 169,008

[22] Filed: Mar. 16, 1988

[51] Int. Cl.⁴ ............................................. A22B 1/00
[52] U.S. Cl. .................................................. 17/44.2
[58] Field of Search ............................ 17/21, 44, 44.2; 294/79

[56] References Cited

U.S. PATENT DOCUMENTS 3,623,187  11/1971  Grubbs ........................... 17/44.2 X
4,581,790  4/1986   Horvath .............................. 17/44.2
4,625,363  12/1986  Watson ............................... 17/44.2

Primary Examiner—Willie G. Abercrombie
Attorney, Agent, or Firm—Larson & Taylor

[57] ABSTRACT

A skinning device is provided for assisting in the skinning of squirrels and other small game which comprises a generally U-shaped holder including a front wall and side walls. The front wall includes a single central slot formed in the upper edge thereof, and this slot includes an upper generally V-shaped slot opening, an intermediate, part-circular portion in which the head of the squirrel is received during one step of a skinning operation and an elongate downwardly extending lower portion in which the tail of a squirrel is received during a separate step. A rope or cord connected to the side walls of the holder secures the holder to an upright such as a tree. The side walls include aligned holes through which the cord extends, and these aligned holes are located in the side walls at height relative to the intermediate portion of the slot such that the head of a squirrel being skinned is captured beneath the cord. One of the side walls includes a notch therein in which the cord can be secured to provide tightening of the cord.

12 Claims, 1 Drawing Sheet

SQUIRREL SKINNING DEVICE

FIELD OF THE INVENTION

The present invention relates to a device for assisting in the manual skinning and dressing of squirrels and other small animals.

BACKGROUND OF THE INVENTION

A number of devices have been developed for holding squirrels, rabbits and other small animals while the animals are being skinned and dressed. Some examples of such devices are disclosed in U.S. Pat. Nos. 3,570,049 (Muckelrath); 3,623,187 (Grubbs); and 4,625,363 (Watson); and in the patents referred to in these patents.

Briefly considering the aforementioned patents, the Muckelrath patent discloses a small game skinning board including first slot in the upper edge thereof for holding the head of an animal and two further slots which cooperate with a plate in holding the feet of the animal. The board is adapted to be supported in front of a wall or other support by means of a block having bores therein which receive nails or the like.

The Grubbs patent discloses a skinning tool in the form of support rod bolted to a support and including a base portion including depending side bars and a transverse rod connected to lower ends of the side bars. An elongated end of the rod is bent upwardly to form, together with one of the side bars, a V-shaped recess within which a hind leg of a carcass of an animal to be skinned is received. A rigid "tail bone extraction element" having an internal V-shaped notch is welded between the other side bar and bent up extension of the transverse rod.

The Watson patent discloses a squirrel skinning holder including a vertically extending portion which defines a first slot dimensioned to receive the body of the squirrel in the area of the chest and two additional slots, on either side of the first slot, dimensioned to receive the hind legs of the squirrel. A back portion having a cord extending therethrough enables the holder to be supported against an upright. The cord is used only to tie the holder to an upright such as a tree and does not act to hold the squirrel in place during the skinning process.

SUMMARY OF THE INVENTION

In accordance with the invention, a skinning device is provided for aiding in the skinning of a squirrel or other small animals which provides substantial advantages over devices of the prior art used for the same or similar purposes, including devices such as described previously. The device of the invention is rugged and robust in construction, easy to use both in setting up the device and in the actual skinning and dressing process and quite inexpensive to manufacture. The device of the invention enables skinning and dressing of a squirrel or like animal to be achieved in a very rapid and efficient manner, and among other important advantages, provides improved holding of the squirrel in place during the skinning and dressing process.

According to a preferred embodiment thereof, the skinning device comprises a support member for supporting the squirrel during the skinning process and including a front wall, and first and second side walls which extend rearwardly of the front wall. The front wall includes a slot therein having a lower, relatively narrow slot portion in which the tail of the squirrel is received during a first stage of the skinning process and a further shaped slot portion contiguous with the lower slot portion in which the head of the squirrel is received during a second stage of the skinning process. An elongate securing means, e.g., a rope or cord, serves to secure the support member in place relative to an upright or support, such as a tree, so that the front wall of the support member is spaced from the upright by side walls. The side walls each include an aperture therein through which the securing means extends, and the apertures are located relative to the front wall and the slot therein such that the head of the squirrel is captured beneath said the securing means when the head of the squirrel is received in the aforesaid further slot portion.

Preferably, one of the side walls includes a slot in an edge thereof in which the rope or cord constituting the securing means is received to provide tightening of the rope or cord in place. In accordance with a further important aspect of the invention, the further shaped slot portion referred to above includes an upper, generally V-shaped slot opening at the top edge of the front wall and a central or intermediate slot portion, at least part of which is substantially circular in shape, located below the slot opening, with the lower portion of the slot referred to above extending downwardly from the central slot portion centrally thereof.

Advantageously, the side walls are inclined at an angle so as to be spaced further apart at the top than the bottom, and the front wall of the support member is inclined rearwardly front bottom to top.

The rope or cord constituting the securing means preferably includes a gripping portion at one end and a loop portion at the other end through which the one end is inserted to enable tightening of the rope or cord around the upright or support.

Other features and advantages of the invention are set forth in, or will be apparent from the detailed description of a preferred embodiment which follows.

DESCRIPTION OF A PREFERRED EMBODIMENT

Referring to FIGS. 1 to 4, a skinning device constructed in accordance with a preferred embodiment of the invention is shown. The device, which is generally denoted 10 in FIG. 1, basically comprises a generally U-shaped support or holder member 12 and an elongate securing means preferably comprising a rope or cord 14 for securing the support member 12 in place on a tree or other upright or support.

Figure 1:
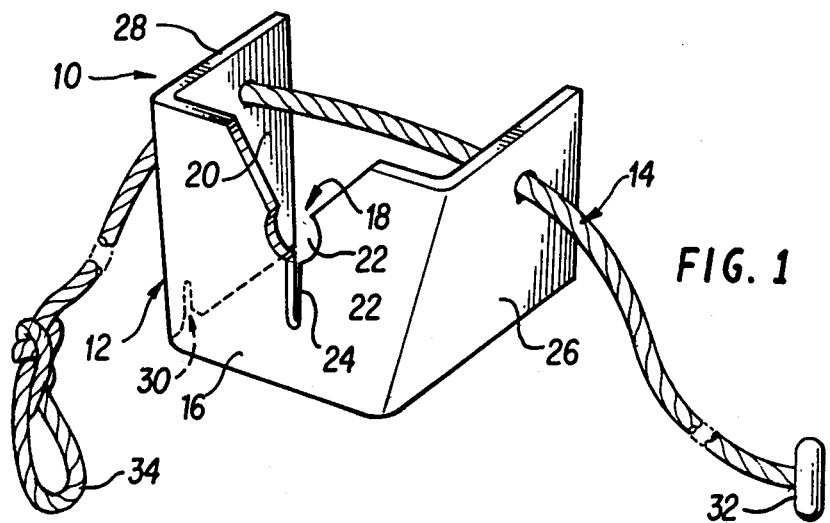
FIG. 1 is a perspective view of a preferred embodiment of the squirrel skinning device of the invention.
Figure 2:
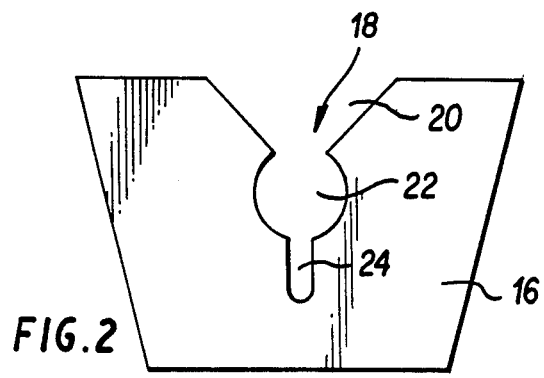
FIG. 2 is a front elevational view of the device of FIG. 1.
Figure 3:
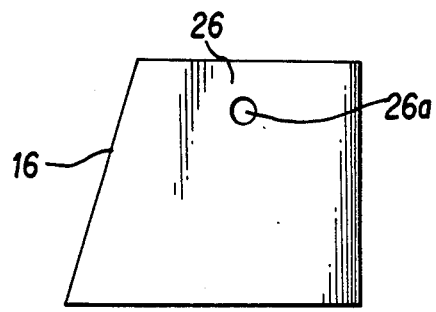
FIG. 3 is a right side elevational view of the device of FIG. 1.
Figure 4:
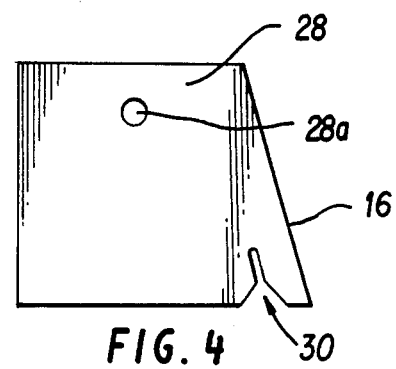
FIG. 4 is a left side elevational view of the device of FIG. 1.

Support or holder member 12 includes a front wall 16 which is slightly canted or inclined backwardly from bottom to top, as is best seen in FIGS. 3 and 4, and includes a central slot 18 in the upper edge thereof, as is best seen in FIGS. 1 and 2. Central slot 18 includes an upper generally V-shaped slot opening portion 20 which provides access to the remainder of the slot, and intermediate portion 22 which is generally part circular in cross section and which receives the head of the squirrel during one step in the skinning process described below, and a third lower-downwardly extending, relatively narrow slot portion 24 which receives the tail of squirrel during a earlier step in the skinning process.

Support or holder member 12 also includes rearwardly extending side walls 26 (FIGS. 1 and 3) and 28 (FIGS. 1 and 4) having respective aligned holes or apertures 26a and 28a formed therein through which the rope or cord 14 extends. Side wall 28 includes a notch or slot 30 therein which is adapted to receive one end of rope 14 to provide tightening thereof, as explained in detail below.

Cord or rope 14 includes a handle 32 or a like gripping member at one end thereof and a loop 34 at the other end thereof through which the handle end 22 is inserted to from a large loop used in securing holder member 12 to a tree, post or the like.

Figure 5:
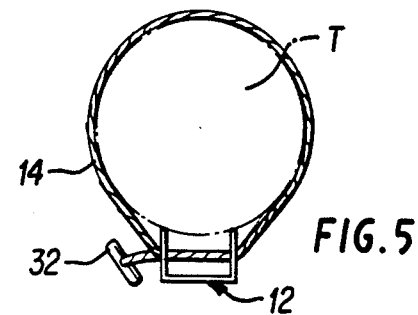
FIG. 5 is a schematic representation of the device of FIGS. 1 to 4 secured in place around a tree and ready for use.

Considering the latter point further and referring to FIG. 5, holder member 12 is shown as being secured to a tree by a loop formed in cord 14. The end at which handle 32 is located is pulled tight so that holder member 12 is held firmly against the T and then is inserted in, i.e., pulled up into the notch or slot 30 formed in side wall 28 to hold the cord 14, and thus the holder 12, securely in place to ensure that there is no slippage during the skinning and dressing operation. At this point, the skinning device 10 is ready for use.

Figure 6:
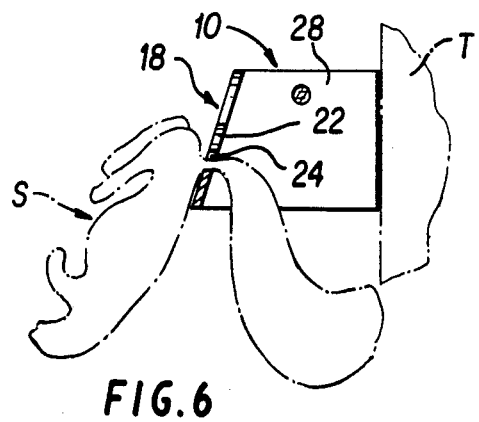
FIG. 6 is a cross section view of the device of FIGS. 1 to 4 secured in place as shown in FIG. 5, illustrating use of the device in a first step in the skinning operation.

Referring to FIG. 6, a cross sectional view is shown of holder 10 which illustrates a first step in a skinning operation wherein the tail of squirrel S is inserted at the tail bone in lower slot portion 24 of slot 18. This holds the tail and keeps it from pulling through when the hind legs of the squirrel are pulled towards the individual doing the skinning. During this (and all other stages) of the skinning, this individual stands facing the holder device 10 and this particular step in the skinning operation removes the skin from the head, front legs and about one-half of the body of the squirrel.

Figure 7:
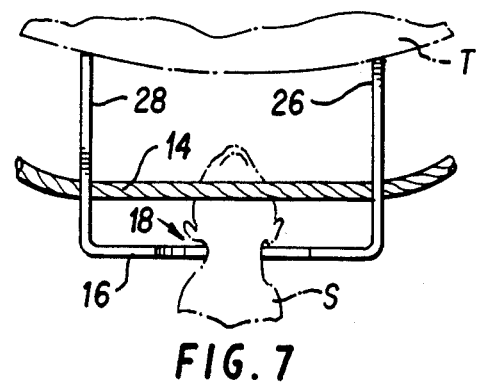
FIG. 7 is a top plan view of the device of FIGS. 1 to 4, secured in place as shown in FIG. 5, illustrating use of the device in a further step in the skinning operation.

Referring to FIG. 7, a top plan of device 10 is shown which illustrates the next step in the skinning operation. During this step, the head of the squirrel is inserted into intermediate slot portion 22 with the throat facing upwardly and with the mouth and nose region under the rope or cord 14. As illustrated, the rope 14 is held in an extremely taut manner between side walls 26 and 28 and thus, the head of the squirrel is held securely and tightly in slot portion 22 under rope 14 and thus permits the remaining skinning and gutting operations to be completed.

Although the present invention has been described relative to a specific exemplary embodiment thereof, it will be understood by those skilled in the art that variations and modifications can be effected in this exemplary embodiment without departing from the scope and spirit of the invention.

I claim:

1. A skinning device for aiding in the skinning of a squirrel or other small animal, said device comprising:
   a support member for supporting the squirrel during a skinning process and including a front wall, and first and second side walls which extend rearwardly of said front wall, said front wall including a slot therein having a lower, relatively narrow slot portion in which the tail of the squirrel is received during a first stage of the skinning process and a further slot portion contiguous with said lower slot portion in which the head of the squirrel is received during a second stage of the skinning process; and
   an elongate securing means for securing the support member in place relative to an upright or support with the front wall of the support member spaced from the upright by said side walls;
   said side walls each including an aperture therein through which said securing means extends, and said apertures being located relative to said front wall and the slot therein such the head of the squirrel is captured beneath said securing means when the head of the squirrel is received in said further slot portion.

2. A skinning device as claimed in claim 1 wherein said elongate securing means comprises a rope or cord and wherein one of said side walls includes a slot in an edge thereof in which said rope or cord is received to provide tightening of the rope or cord in place.

3. A skinning device as claimed in claim 1 wherein said further slot portion includes an upper, generally V-shaped slot opening at the top edge of the front wall and an intermediate slot portion, at least part of which is substantially circular in shape, located below said slot opening, said lower portion of said slot extending downwardly from said intermediate slot portion centrally thereof.

4. A skinning device as claimed in claim 1 wherein said side walls are inclined at an angle so as to be spaced further apart at the top than the bottom.

5. A skinning device as claimed in claim 1 wherein the front wall of the support member is inclined rearwardly from the bottom to top.

6. A skinning device as claimed in claim 1 wherein said elongate securing means comprises a rope or cord which includes a gripping portion at one end, and a loop portion at the other end through which said one end is inserted to enable tightening of the rope or cord around the upright or support.

7. A skinning device for assisting in the skinning of squirrels and other small game, said device comprising a generally U-shaped holder member including a front wall and first and second side walls, said front wall including a single central slot formed in the upper edge thereof, said slot including an upper, generally V-shaped slot opening, an intermediate part circular portion in which the head of the squirrel is received during one step of a skinning operation and an elongate slot portion in which the tail of the squirrel is received during a separate step in the skinning operation; and means connected to said side walls for securing said holder member to an upright or other support.

8. A skinning device as claimed in claim 7 wherein said front wall is inclined rearwardly from bottom to top and said side walls are inclined inwardly from top to bottom.

9. A skinning device as claimed in claim 7 wherein said side walls include aligned holes therein and said securing means comprises a cord which extends through said holes, said aligned holes being located in said side walls at height relative to said intermediate portion of said slot such that the head of a squirrel being skinned is captured beneath the cord.

10. A skinning device as claimed in claim 9 wherein said cord includes a handle at one end thereof.

11. A skinning device as claimed in claim 9 wherein said cord includes a loop in one end thereof.

12. A skinning device as claimed in claim 9 wherein one of said side walls includes a notch therein in which the cord can be secured to provide tightening of the cord around an upright or other support.

* * * * *